United States Patent Office 3,400,281
Patented Sept. 3, 1968

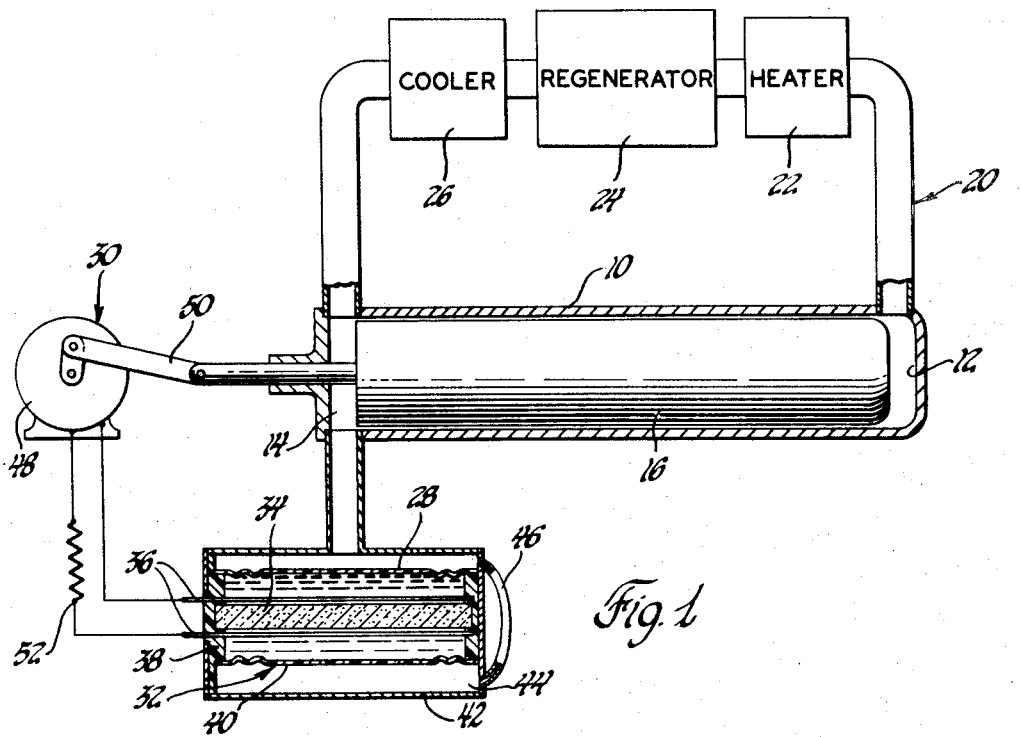
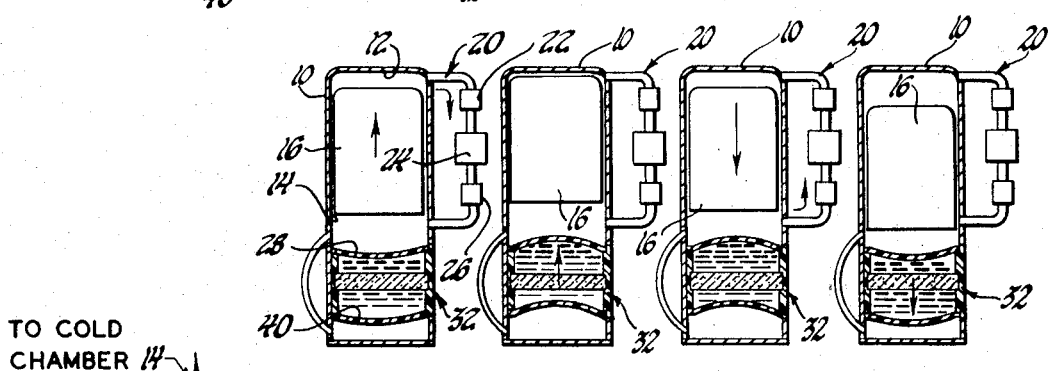
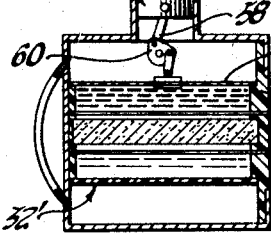

3,400,281
STIRLING CYCLE DRIVE FOR AN ELECTRO-KINETIC TRANSDUCER
Marvin J. Malik, Indianapolis, Ind., assignor to General Motors Corporation, Detroit, Mich., a corporation of Delaware
Filed Nov. 27, 1964, Ser. No. 414,219
14 Claims. (Cl. 310—2)

ABSTRACT OF THE DISCLOSURE

An energy conversion system utilizing the Stirling cycle and an electrokinetic transducer to convert thermal energy to electrical energy. This is achieved by replacing in a conventional Stirling cycle engine the usual power piston with a flexible diaphragm. The flexible diaphragm performs the power piston's functions of alternately compressing and expanding the working medium during the Stirling cycle and additionally the resultant pressure variations are used to drive an electrokinetic transducer. When the electrokinetic transducer is driven in this way an electrokinetic liquid is urged back and forth through a porous member so as to develop an alternating electric potential across the transducer's electrodes. This electric potential is used to drive a load and can also be used to drive a motor which in turn drives the Stirling cycle engine's displacer piston.

In an alternate construction the power piston is not replaced but is connected to a flexible diaphragm that drives the electrokinetic transducer in the same manner as the flexible diaphragm when used as a replacement for the power piston.

---

This invention relates generally to energy conversion systems and, particularly, to an energy conversion system in which thermal energy is converted to electrical energy.

In converting energy from one form to another the goals are almost always the same. Not only must the final form of energy be useful, but the conversion must be done efficiently and without the need for complicated apparatus. If the conversion system includes some intermediate step where initial energy is converted to mechanical energy, and the mechanical energy is subsequently transformed into the final form, it can be expected that the intermediate step will inherently introduce losses due, for example, to friction. Therefore, if possible, this intermediate mechanical step should be avoided. The present invention does this in providing a unique system for converting thermal energy into pressure variations and then utilizes these pressure variations to develop electrical energy.

It is further proposed to utilize the Stirling cycle in a unique way to convert heat into electricity. Additionally contemplated is the accomplishment of this conversion without interfering with the normal Stirling cycle; therefore, not only is the usual mechanical power still available but also electrical power.

A novel drive mechanism for a Stirling cycle engine is also comprehended by the invention.

The foregoing and other objects and advantages of the invention will become apparent from the following description and the accompanying drawing, in which:

FIGURE 1 illustrates schematically an energy conversion system incorporating the principles of the invention;

FIGURES 2a, b, c, and d illustrate diagrammatically the four principal stages of the Stirling cycle employed in the system; and FIGURE 3 shows schematically a modification of the FIGURE 1 system.

Referring initially to FIGURE 1, the system portrayed includes a cylinder 10 having a hot chamber 12 at one end and a cold chamber 14 at the other end. Slidable within the cylinder 10 is a displacer piston 16, which functions to transfer a working fluid (gaseous) medium back and forth through a heat exchange circuit denoted generally at 20. This heat exchange circuit 20 includes the usual heater, regenerator and cooler, respectively denoted by the numeral 22, 24 and 26. A power member 28, which in the FIGURE 1 embodiment is a flexible diaphragm, serves to alternately compress and expand the working medium. Thus, the working medium goes through a thermodynamic cycle that converts part of the heat from the heater 22 into useful work at the power member 28. A drive mechanism, denoted generally by the numeral 30, controls the reciprocating movements of the piston 16 so as to be in the proper phase relation with the reciprocations of the power member 28. The displacer piston 16, the power member 28, the drive mechanism 30, and the heat exchange circuit 20 correspond in function respectively to the displacer and power pistons, the rhombic drive mechanism, and the heat exchange circuit in a conventional Stirling cycle engine. Thus, they each contribute to and perform during the Stirling cycle in the same way as these well known counterparts.

Associated with the power member 28 and driven thereby is an energy converter, such as an electrokinetic transducer 32, that develops in a way to be explained an electric power. The electrokinetic transducer 32 in operation and as suggested converts the pressure variations of the Stirling cycle into an alternating electric potential. This could be done by a suitable piezoelectric crystal, but is preferably achieved with the transducer 32 illustrated in FIGURE 1. The transducer 32 may be any commercially available type, such as one manufactured by Consolidated Electrodynamics Corporation, whereby an electrokinetic liquid, such as acetonitrile, water, or an aqueous solution of hydrochloric acid, is transferred back and forth through a porous member 34 formed, e.g., of fritted glass, Carborundum or cellulose. This back and forth movement of the electrokinetic liquid through the porous member 34 will in a way well known develop an alternating electric potential across a pair of electrodes 36 positioned on each side of the porous member 34. These electrodes 36 may be silver-plated grids or the equivalent. The electrokinetic liquid is contained within an enclosure 38 of some suitable insulating material, as glass. The ends of the enclosure 38 are sealed at the top by the power member 28 and at the bottom by a flexible buffer member 40. The enclosure 38 is fixedly maintained within a container 42 so as to provide at the bottom a buffer space 44 that communicates via a capillary tube 46 with the upper end of the container 42, which in turn communicates with the cold chamber 14 at the end of the cylinder 10.

The purpose of the buffer space 44 is to provide a restoring force for returning the electrokinetic liquid back through the porous member 34 after having been transferred therethrough by the movement of the power member 28 in a way which will be further explained. By utilizing a capillary tube 46 of a suitable cross-sectional area the buffer space 44 will be charged at all times to the mean pressure of the working medium as it is alternately compressed and expanded, or in other words to the mean pressure of the thermodynamic cycle. This mean pressure will, therefore, urge the flexible buffer member 40 upwardly and accordingly the electrokinetic fluid whenever it is greater than the cycle pressure in the cold chamber 14. The size of the capillary tube 46 is sufficiently small to afford whatever orifice effect is required to prevent the transfer of the working medium therethrough from appreciably altering the pressure in the cold chamber 14.

The drive mechanism 30 includes a dynamoelectric motor 48 of any suitable type that can operate at variable speeds and that through an appropriate linkage 50 will reciprocate the displacer piston 16 so as to generate the back and forth flow of the working medium through the heat exchanger circuit 20 so as to carry out the Stirling cycle. The electric power for operating the motor 48, as illustrated in FIGURE 1, can be derived from the electrokinetic transducer 32, e.g., by connecting the electrodes 36 to the armature windings (not shown) of the motor 48. Thus the motor 48 can constitute part of the load imposed upon the electrokinetic transducer 32 along with others represented generally by a load resistor 52.

Considering now an operational cycle of the system while referring to FIGURES 2a, b, c, and d, it will be first assumed that the working medium in the hot chamber 12 has been heated by the heater 22 to increase its pressure. This will commence the FIGURE 2d stage and the volume of the working medium will increase. This increased pressure in the hot chamber 12 will, due to the nature of the Stirling cycle, also exist in the cold chamber 14 and, therefore, will urge the power member 28 downwardly. Consequently, the electrokinetic fluid will be forced downwardly through the porous member 38 and provide one half cycle of the alternating potential.

Next and in a proper out of phase relation with the movements of the power member 28, the displacer piston 26 is moved upwardly, as indicated by the arrow in FIGURE 2a, from its bottom most or bottom dead center position, illustrated in FIGURE 2d, to urge the hot working medium from the hot chamber 12 through the heat exchange circuit 20 so that heat is stored by the regenerator 24 to commence the stage of FIGURE 2a. Consequently, the pressure of the working medium will decrease. The downward transfer of the electrokinetic fluid during the FIGURE 2d stage will have deflected the flexible member 40 downwardly since the mean pressure in the buffer space 44 was less than the maximum pressure of the cycle developed during the FIGURE 2d stage. With the cycle pressure now reduced below its mean value, the mean pressure within the buffer space 44 will dominate and urge the flexible member 40 upwardly to the position portrayed in FIGURE 2d, thus moving the electrokinetic fluid back and upwardly through the porous member 34 so as to provide the other half cycle of the alternating potential. As a result, the power member 28 will be moved to its upward position and cause the working medium to be compressed during the FIGURE 2b stage. At this time the displacer piston 16 will be in its topmost or top dead center position.

Upon the competion of the isothermal compression stage, the stage of FIGURE 2c will commence, with the displacer piston 16 moving downwardly, and force the working medium back through the heat exchange circuit 20 where the heat stored within the regenerator 24 during the constant volume heat rejection stage will be added to the working medium so as to recommence the cyce. The cooler 26 removes heat from the working medium during the isothermal expansion stage.

The various sizes and parameters to be employed by the system will of course be determined by the output requirements of the system. Then too, the flexible members 28 and 40 may require certain biases either external or internal to obtain the preferred phase relationship with each other and also relative to displacer piston movements. These considerations are calibrations that are well understood by those versed in the art.

In the FIGURE 1 embodiment the power member 28, while serving its function of compressing and expanding the working medium, also, as was explained, drives the electrokinetic transducer 32 to move the electrokinetic liquid through the porous member 34 so as to develop the alternating electronic potential for supplying power to the motor 48 and also the load 52. It is also possible, as illustrated in FIGURE 3, to modify the power member so as to, during the working stroke, drive some other apparatus and thus derive both mechanical and electrical power. This is accomplished in the FIGURE 3 modification by employing a power member of the mentioned customary piston type indicated generally by the numeral 54. The upper end of the piston 54 will, of course, be in communication with the cold working chamber 14 and be connected to a flexible member 56 which will serve the same function as the power member 28 in the FIGURE 1 system, i.e., enclose the container 38' at its upper end. The electrokinetic transducer 32' otherwise is the same as that in the FIGURE 1 system. The piston 54 can at 58 be connected to a crankshaft 60 or something similar and, thus, during its reciprocations drive other apparatus. The electrokinetic transducer 32' will continue to supply electrical power to the load 52 and to the motor 48. Or, if preferred, the crankshaft 60 can be appropriately drive connected to the displacer piston 16. Of course, the required phase relationship with the reciprocations of the piston 54 would have to be maintained. The usual rhombic drive mechanism could serve this purpose.

As will now be appreciated, the system in utiizing the Stirling cycle converts thermal energy into electrical energy in such a way that the conventional Stirling cycle operation is in no way altered, thus enabling both electrical and mechanical power to be derived. Moreover, this electrical energy can be used to drive the displacer piston, thereby simplifying the required drive mechanism structure.

The invention is to be limited only by the following claims.

What is claimed is:

1. In an energy conversion system, the combination of hot and cold chambers each of variable volume, a heat exchange circuit connecting the chambers, a working fluid medium within the heat exchange circuit, displacer means operative to move the working fluid medium back and forth between the chambers and through the heat exchange circuit whereby the working fluid medium is alternately heated and cooled, and power means operative to alternately compress and expand the working fluid medium and also adapted to develop an electric potential while alternately expanding and compressing the working fluid medium thereby converting heat into electrical energy.

2. In an energy conversion system, the combination of hot and cold chambers each of variable volume, a heat exchange circuit connecting the chambers, a working fluid medium within the heat exchange circuit, displacer means operative to move the working fluid medium back and forth between the chambers and through the heat exchange circuit whereby the working fluid medium is alternately heated and cooled, and power means operative to alternately compress and expand the working fluid medium and also adapted to develop an electric potential while alternately expanding and compressing the working fluid medium, the power means including means converting the pressure variations of the working fluid medium due to the alternate expansion and compression thereof into a corresponding electric potential.

3. In an energy conversion system, the combination of hot and cold chambers each of variable volume, a heat exchange circuit connecting the chambers, a working fluid medium within the heat exchange circuit, displacer means operative to move the working fluid medium back and forth between the chambers and through the heat exchange circuit whereby the working fluid medium is alternately heated and cooled, and power means operative to alternately compress and expand the working fluid medium and also adapted to develop an electric potential while alternately expanding and compressing the working fluid medium, the power means including an electrokinetic transducer having a member thereof responsive to the pressure variations of the working fluid medium from the alternate expansion and contraction thereof and so arranged as to develop a corresponding alternating electric potential.

4. In an energy conversion system, the combination of hot and cold chambers each of variable volume, a heat exchange circuit connecting the chambers, a working fluid medium within the heat exchange circuit, displacer means operative to move the working fluid medium back and forth between the chambers and through the heat exchange circuit whereby the working fluid medium is alternately heated and cooled, and power means operative to alternately compress and expand the working fluid medium while developing mechanical power and also adapted to develop an electric potential while alternately expanding and compressing the working fluid medium, the power means including an electrokinetic transducer communicating with the cold chamber, a power member operative both to produce the alternate compression and expansion of the working fluid medium and to drive the electrokinetic transducer thereby producing the electric potential.

5. In an energy conversion system; the combination of hot and cold chambers each of variable volume; a heat exchange circuit connecting the chambers and including a regenerator; a working fluid medium within the heat exchange circuit; displacer means operative to move the working fluid back and forth between the chambers and through the heat exchange circuit whereby the working fluid medium is alternately heated and cooled; and power means operative to alternately compress and expand the working fluid medium and also adapted to develop an alternating electric potential while alternately expanding and compressing the working fluid medium; the displacer means including means causing the working fluid to be moved back and forth between the chambers in an out of phase relationship with the alternate compression-expansion of the working fluid medium by the power means; the power means comprising an electrokinetic transducer and a power member operative both to produce the alternate compression and expansion of the working fluid medium and to drive the electrokinetic transducer; the electrokinetic transducer including an enclosure having a porous member mounted therein so as to divide the enclosure into two compartments containing an electrokinetic fluid, a pair of electrodes one on each side of the porous member, the power member being so arranged and constructed as to close one end of the enclosure and so as to be in communication with the cold chamber, and means closing the other end of the enclosure and arranged to provide a restoring force; the power member in producing the alternate compression and expansion of the working fluid medium having a reciprocating movement so as to also cause the electrokinetic fluid to pass through the porous member in one direction; the restoring force causing the electrokinetic fluid to pass through the porous member in the other direction thereby developing the alternating electric potential across the electrodes.

6. In an energy conversion system; the combination of hot and cold chambers each of variable volume; a heat exchange circuit connecting the chambers; a working fluid medium within the heat exchange circuit; displacer means operative to move the working fluid medium back and forth between the chambers and through the heat exchange circuit whereby the working fluid medium is alternately heated and cooled; and power means operative to alternately compress and expand the working fluid medium and also adapted to develop an alternating electric potential while alternately expanding and compressing the working fluid medium; the power means comprising an electrokinetic transducer, a power member communicating with the cold chamber and operative both to produce the alternate compression and expansion of the working fluid medium and to drive the electrokinetic transducer, and a buffer chamber arranged to have a restricted communication with the cold chamber so as to be continously charged to the mean pressure of the working fluid medium; the electrokinetic transducer including an enclosure having a porous member mounted therein so as to divide the enclosure into two compartments containing an electrokinetic fluid, a pair of electrodes one on each side of the porous member, the enclosure having the power member in communication with one end thereof, and a flexible member closing the other end of the enclosure and arranged so as to be in communication with the buffer chamber; the power member in producing the alternate compression and expansion of the working fluid medium having reciprocating movements so as to cause the electrokinetic fluid to pass through the porous material, the flexible member being operative to provide a restoring force for passing the electrokinetic fluid back through the porous material thereby developing the alternative electric potential across the electrodes.

7. In an energy conversion system, the combination of means defining a chamber of lower temperature and a chamber of higher temperature, a heat exchange circuit connecting the chambers, a working fluid medium within the heat exchange circuit, and displacer means and power means operating out of phase respectively to move the fluid working medium back and forth between the chambers and through the heat exchange circuit whereby the working fluid medium is alternately heated and cooled and to vary the volumes of the fluid working medium in the chambers, the power means including a reciprocating member operative to develop an electric potential while causing the volumes of the working fluid medium in the chambers to be varied.

8. In an energy conversion system, the combination of means defining a chamber of lower temperature and a chamber of higher temperature, a heat exchange circuit connecting the chambers, a working fluid medium within the heat exchange circuit, displacer means and power means operating out of phase respectively to move the fluid working medium back and forth between the chambers and through the heat exchange circuit whereby the working fluid medium is alternately heated and cooled and vary the volumes of the fluid working medium in the chambers, and means developing an electric potential in response to changes in the volumes of the working fluid medium, the power means including a reciprocating member operative to drive the electric potential developing means while causing the volumes of the working fluid medium in the chambers to be varied.

9. In an energy conversion system; the combination of means defining a chamber of lower temperature and a chamber of higher temperature; a heat exchange circuit connecting the chambers; a working fluid medium within the heat exchange circuit; displacer means and power means operating out of phase respectively to move the fluid working medium back and forth between the chambers and through the heat exchange circuit whereby the working fluid medium is alternately heated and cooled and to vary the volumes of the working fluid medium in the chambers; and an electrokinetic transducer for developing an alternating electric potential in response to changes in the volumes of the fluid working medium; the power means including a reciprocating member in communication with the chamber of lower temperature and operatively connected to the electrokinetic transducer so as to drive the electrokinetic transducer while causing the volumes of the working fluid medium in the chambers to be varied; the electrokinetic transducer including an enclosure having a porous member mounted therein so as to divide the enclosure into two compartments containing an electrokinetic fluid, a pair of electrodes one in each side of the porous member, the enclosure having one end thereof communicating with the reciprocating member, and restoring means enclosing the other end of the enclosure adapted to provide a restoring force for returning the electrokinetic fluid through the porous member after the electrokinetic fluid has been driven therethrough by the reciprocating member so as to develop the alternating electric potential across the electrodes.

10. In an energy conversion system; the combination of means defining a chamber of lower temperature and a chamber of higher temperature; a heat exchange circuit connecting the chambers; a working fluid medium within the heat exchange circuit; displacer means and power means operating out of phase respectively to move the working fluid medium back and forth between the chambers and through the heat exchange circuit whereby the working fluid medium is alternately heated and cooled and to vary the volumes of the working fluid medium in the chambers; and an electrokinetic transducer for developing an electric potential in response to changes in the volumes of the working fluid medium, the power means including a reciprocating member communicating with the chamber of lower temperature and operatively connected to the electrokinetic transducer so as to drive the electrokinetic transducer while causing the volumes of working fluid medium in the chambers to be varied and a buffer chamber arranged to have restricted communication with the chamber of lower temperature so as to be continuously charged to the mean pressure of the working fluid medium, the reciprocating member also being operatively drive connected to the displacer means and to an external load; the electrokinetic transducer including an enclosure having a porous member mounted therein so as to divide the enclosure into two compartments containing electrokinetic fluid, a pair of electrodes one in each side of the porous member, a flexible member closing one end of the enclosure and arranged so as to be drive connected to the reciprocating member, and a flexible buffer member closing the other end of the enclosure and communicating with the buffer chamber; the reciprocating member in causing the volumes of working fluid medium in the chambers to be varied reciprocating so as to cause the electrokinetic fluid to pass through the porous member; the flexible buffer member being operative to provide a restoring force for passing the electrokinetic fluid back through the porous member thereby developing an alternating electric potential across the electrode.

11. In a drive mechanism for a Stirling cycle engine of the character having reciprocating displacer and power members, the combination comprising a dynamoelectric motor for reciprocating the displacer member, and an electrokinetic transducer operated by the reciprocating power member to develop an electric potential for operating the dynamoelectric motor.

12. In a drive mechanism for a Stirling cycle engine of the character having reciprocating displacer and power members, the combination comprising a dynamoelectric motor for reciprocating the displacer member, an electrokinetic transducer operated by the reciprocating power member to develop an electric potential for operating the dynamoelectric motor, the electrokinetic transducer including an enclosure having a porous member mounted therein so as to divide the enclosure into two compartments containing an electrokinetic fluid, a pair of electrodes one in each side of the porous member so arranged as to be electrically connected to the dynamoelectric motor, the reciprocating power member being associated with the enclosure so as to drive the electrokinetic fluid through the porous member, means also associated with the enclosure to drive the electrokinetic fluid back through the porous member so as to develop an alternating electric potential at the electrodes for operating the dynamoelectric motor.

13. In a drive mechanism for a Stirling cycle engine of the character having reciprocating displacer and power members, the combination comprising a dynamoelectric motor for reciprocating the displacer member and an electrokinetic transducer operated by the reciprocating power members so as to develop an electric potential for operating the dynamoelectric motor, the electrokinetic transducer including an enclosure having a porous member mounted therein so as to divide the enclosure into two compartments containing an electrokinetic fluid, a pair of electrodes one in each side of the porous member, the power member being so arranged as to provide a closure for one end of the enclosure and also to force the electrokinetic fluid through the porous member, a flexible buffer member arranged to close the other end of the enclosure and adapted to provide a restoring force for returning the electrokinetic fluid through the porous member so as to develop an alternating electric potential for operating the dynamoelectric motor.

14. In a drive mechanism for a Stirling cycle engine of the character having reciprocating displacer and power members; the combination comprising a dynamoelectric motor for reciprocating the displacer member; transducer means operated by the reciprocating power member to develop an alternating electric potential for operating the dynamoelectric motor; the transducer means including a porous member and a pair of electrodes one on each side of the porous member and electrically connected to the dynamoelectric motor, the power member being operatively associated with the transducer means so as to drive an electrokinetic fluid through the porous member in one direction, and means providing a restoring force for driving the electrokinetic fluid back through the porous member in the other direction so as to develop an alternating electric potential across the electrodes.

References Cited

UNITED STATES PATENTS

| | | | |
|---|---|---|---|
| 2,769,929 | 11/1956 | Hardway | 310—2 |
| 2,782,394 | 2/1957 | Hardway | 310—2 XR |
| 2,836,033 | 5/1958 | Marrison | 60—24 |
| 3,220,201 | 11/1965 | Heuchling et al. | 60—24 XR |
| 3,074,244 | 1/1963 | Malaker | 62—6 |
| 3,101,596 | 8/1963 | Rinia | 62—6 |
| 3,216,190 | 11/1965 | Baker | 60—24 |

MILTON O. HIRSHFIELD, *Primary Examiner.*

D. F. DUGGAN, *Assistant Examiner.*